US006952198B2

(12) United States Patent
Hansen

(10) Patent No.: US 6,952,198 B2
(45) Date of Patent: Oct. 4, 2005

(54) SYSTEM AND METHOD FOR COMMUNICATION WITH ENHANCED OPTICAL POINTER

(76) Inventor: Karl C. Hansen, 8 Flume, Amherst, NH (US) 03031

( * ) Notice: Subject to any disclaimer, the term of this patent is extended or adjusted under 35 U.S.C. 154(b) by 183 days.

(21) Appl. No.: 10/085,287

(22) Filed: Feb. 28, 2002

(65) Prior Publication Data

US 2003/0169233 A1 Sep. 11, 2003

Related U.S. Application Data

(63) Continuation-in-part of application No. 09/906,218, filed on Jul. 16, 2001, which is a continuation of application No. 09/347,761, filed on Jul. 6, 1999, now Pat. No. 6,275,214.

(51) Int. Cl.$^7$ .................................................. G09G 5/00
(52) U.S. Cl. .......................... 345/158; 345/168; 341/22
(58) Field of Search ................................ 345/156, 158, 345/168–172; 341/20–26; G09G 5/00

(56) References Cited

U.S. PATENT DOCUMENTS 3,740,559 A * 6/1973 Scanlon et al. ............. 398/132
3,885,096 A    5/1975 Inuiya (Continued)

FOREIGN PATENT DOCUMENTS

| FR | 2 731 290 A1 | 9/1996 |
|---|---|---|
| JP | 2-207303 | 8/1990 |
| JP | 3-179517 | 8/1991 |
| JP | 4-37922 | 2/1992 |
| JP | 4-123122 | 4/1992 |
| JP | 409080372 | 3/1997 |
| JP | 09-222951 | 8/1997 |

OTHER PUBLICATIONS

Patent Abstracts of Japan Corresponding To JP 09–080372.
Abstract Corresponding To JP 2207303 A.
Abstract Corresponding To JP 3179517 A.
Abstract Corresponding To JP 4123122.
Abstract Corresponding To JP 4037922 A.
Abstract Corresponding To JP 409080372 A.
Patent Abstracts of Japan Corresponding To JP 09–222951.
Patent Abstracts of Japan Corresponding To JP 09080372.
S. Elrod et al., "Liveboard: A Large Interactive Display Supporting Group Meetings, Presentations and Remote Collaboration", CHI '92, 1992 ACM 0–89791–513–5/92/0005–0599, May 3–7, 1992, pp. 599–607.

Primary Examiner—Alexander Eisen
(74) Attorney, Agent, or Firm—Brooks Kushman P.C.

(57) ABSTRACT

A system and method for communicating information to a remotely located computer include encoding the information using a plurality of features of an optical pointer, transmitting the encoded information to a remote location using the optical pointer, detecting the plurality of features of the optical pointer, decoding the information based on the detected plurality of features of the optical pointer, and generating a command for the remotely located computer based on the decoded information. In one embodiment, a computer presentation system includes a computer, a screen associated with the computer for displaying output from the computer, and a camera in communication with the computer and positioned to capture a plurality of image frames including at least a portion of the screen associated with the computer. The system and method may be used to transmit any type of information including keyboard characters, voice data, or to uniquely identify a pointer for secure operation or simultaneous use of multiple pointers.

8 Claims, 7 Drawing Sheets

U.S. PATENT DOCUMENTS

| | | |
|---|---|---|
| 4,808,980 A | 2/1989 | Drumm |
| 5,045,843 A | 9/1991 | Hansen |
| 5,115,230 A | 5/1992 | Smoot |
| 5,138,304 A | 8/1992 | Bronson |
| 5,146,210 A | 9/1992 | Heberle |
| 5,181,015 A | 1/1993 | Marshall et al. |
| 5,341,155 A | 8/1994 | Elrod et al. |
| 5,400,095 A | 3/1995 | Minich et al. |
| 5,448,261 A | 9/1995 | Koike et al. |
| 5,459,484 A | 10/1995 | Nguyen |
| 5,489,923 A | 2/1996 | Marshall et al. |
| 5,502,459 A | 3/1996 | Marshall et al. |
| 5,504,501 A | 4/1996 | Hauck et al. |
| 5,515,079 A | 5/1996 | Hauck |
| 5,572,251 A | 11/1996 | Ogawa |
| 5,594,468 A | 1/1997 | Marshall et al. |
| 5,704,700 A | 1/1998 | Kappel et al. |
| 5,712,658 A * | 1/1998 | Arita et al. .................. 345/158 |
| 5,784,873 A * | 7/1998 | Aron ........................... 56/377 |
| 5,914,783 A | 6/1999 | Barrus |
| 5,926,168 A | 7/1999 | Fan |
| 6,050,690 A | 4/2000 | Shaffer et al. |
| 6,275,214 B1 | 8/2001 | Hansen |
| 6,323,839 B1 | 11/2001 | Fukuda et al. |
| 6,664,949 B1 * | 12/2003 | Amro et al. ................. 345/168 |

* cited by examiner

SYSTEM AND METHOD FOR COMMUNICATION WITH ENHANCED OPTICAL POINTER

CROSS-REFERENCE TO RELATED APPLICATIONS

This application is a continuation-in-part of U.S. patent application Ser. No. 09/906,218 filed Jul. 16, 2001, which is a continuation of U.S. patent application Ser. No. 09/347,761 filed Jul. 6, 1999, now U.S. Pat. No. 6,275,214, the disclosures of which are hereby incorporated by reference in their entirety.

TECHNICAL FIELD

The present invention relates to a system and method for remotely communicating information using an optical pointer.

BACKGROUND ART

As computers are increasingly being used for graphical presentations and/or demonstrations, larger display devices are used to provide viewing by audiences of varying size. Many presentations, such as slide shows and the like, require relatively simple control of the computer during the actual presentation. Commands which advance or reverse slides or initiate a display sequence require only a basic user interface or remote control to communicate with the computer. However, more sophisticated presentations or demonstrations, such as used for software user training or promotion, require a more sophisticated interface or remote control to effectively operate the computer. Conventional strategies require the presenter to either remain within close proximity of the computer to operate the keyboard and/or pointing device (mouse, touchpad, track ball, etc.) or have an assistant perform the required operations.

The present inventor disclosed a system and method for controlling a windows-oriented computer system using a remote pointer in U.S. Pat. No. 6,275,214. This system is quite valuable for controlling and/or demonstrating one or more computer applications in an auditorium-style presentation. However, this system does not directly address the use of a computer keyboard and/or other input devices during such a presentation. Furthermore, while the system and method disclosed in U.S. Pat. No. 6,275,214 work well for a single optical pointer, they may fail to work properly when one or more optical pointers are used in a collaborative presentation, or in the case of someone attempting to disrupt or interfere with the presentation. As such, a need exists for a system and method for optically communicating more complex information that may also include identification information to authenticate a system user.

DISCLOSURE OF INVENTION

The present invention provides a system and method that enable optical communication of information to a computer using a camera or other optical detector in communication with the computer for capturing and processing optical images to detect the information. The information may include keyboard characters commands, command sequences, voice data, identification data, or other data or control information. The present invention provides for secure optical transmission of information using a pseudo-random modulation strategy which may be used to identify or authenticate one or more optical devices or pointers enabling multiple simultaneous users and preventing unauthorized use. In addition to computer presentation applications, systems and methods in accordance with the present invention may be used for personnel identification and secure high-bandwidth line-of-site communications, for example.

In one embodiment of the present invention, a method for communicating information to a remotely located computer includes encoding the information by modulating at least one feature of an optical pointer, transmitting the encoded information to a remote location using the optical pointer, detecting the modulation of the at least one feature of the optical pointer, decoding the information based on the detected plurality of features of the optical pointer, and generating a command for the remotely located computer based on the decoded information. In another embodiment, a remotely controlled computer presentation system includes a computer, a screen associated with the computer for displaying output from the computer, and a camera in communication with the computer and positioned to capture a plurality of image frames including at least a portion of the screen associated with the computer. The computer includes instructions for processing the image frames to detect modulation of at least one feature of an optical cursor projected onto the screen from an external optical pointer and instructions for decoding the modulated feature to generate a corresponding input for the computer.

Another embodiment of the present invention includes an optical device which transmits encoded information by modulating at least one feature of the optical device to a remotely located optical detector. The optical detector may directly or indirectly detect the modulated feature to decode the information. In one application, the optical device is carried or worn by a user with encoded user identification information directly or indirectly transmitted to a detector that decodes the information to identify the user. For indirect detection, a camera may be used to capture video frames (of a screen, wall, or other surface, for example) that include the modulated optical device feature. The captured frames are then processed to decode the information and identify the user. For direct detection, the optical device may transmit directly to a camera or other optical detector.

In another embodiment of the present invention, a method and device for generating input to a computer system using an optical device, such as a laser pointer are provided. An optical device is used to generate a pattern of movement or other change of properties or position to activate or launch a customizable user interface to provide subsequent input to one or more applications running on the associated computer. For example, specific movement patterns, dwelling on a particular location, or pressing a button to change properties of an optical pointing device may activate or launch a keyboard application that displays or projects a keyboard. The optical device may then be used to generate a series of keystrokes using the keyboard application and transmit or transfer the series of keystrokes to another application on the computer in response to an appropriate "send" command or in response to closing the keyboard application, for example. The user interface may also include various context-sensitive menus to select appropriate commands including a left-click, right-click, or application specific commands, for example, and may be customized by the user or an application developer. Multiple user interfaces may be activated using the optical pointing device to generate corresponding commands if desired. The method and device for providing a customizable user interface application may be used independently with a commercially available optical pointer, or in combination with a modulating optical pointer as disclosed herein.

The present invention provides a number of advantages relative to prior art strategies. For example, the present invention is valuable for controlling and/or demonstrating one or more computer applications in an auditorium-style presentation. The present invention enables input of any kind of information, such as keyboard, voice, mouse, or other input device. The bandwidth of the information input via the system and method of the present invention is limited only by the selection of the pointer features and attributes, video frame capture rate of the camera, and the classic Nyquist sampling restrictions.

The present invention may be used to provide a secure system where the remotely located computer responds only to one or more authorized pointers which exhibit the correct modulation pattern. Such a secure device has many applications beyond the computer control in a presentation system. For example, the present invention may be used for personnel identification, secure high-bandwidth line-of-site communications, and applications where two or more secure pointers are required for operation. As another example, the present invention may be used in military applications to "paint" or irradiate a target using visible or invisible wavelengths for optical-guided vehicles or devices. Using a secure optical pointing device according to the present invention makes it very difficult to "spoof" or confuse the target tracker using an unauthorized optical device. The potential number of unique pointer identifications in such a system is limited only by the pointer design and the encoding methods selected. For a computer presentation application, a secure pointer according to the present invention enables multiple simultaneous users with pointers which may project a seemingly identical spot or cursor, but which may be distinguished by the computer to readily track each pointer's position and commands.

The above advantages and other advantages, objects, and features of the present invention, will be readily apparent from the following detailed description of the best mode for carrying out the invention when taken in connection with the accompanying drawings.

BEST MODE FOR CARRYING OUT THE INVENTION

As used herein, the terms "optical", "light" and related terminology are used in their broadest sense. As understood by those of ordinary skill in the art, such terms include a range of frequencies or wavelengths of the electromagnetic spectrum which encompass visible light, infrared, ultraviolet, and other such frequencies or wavelengths, as distinguished from the radio-frequency spectrum used in other forms of "wireless" control.

Figure 1:
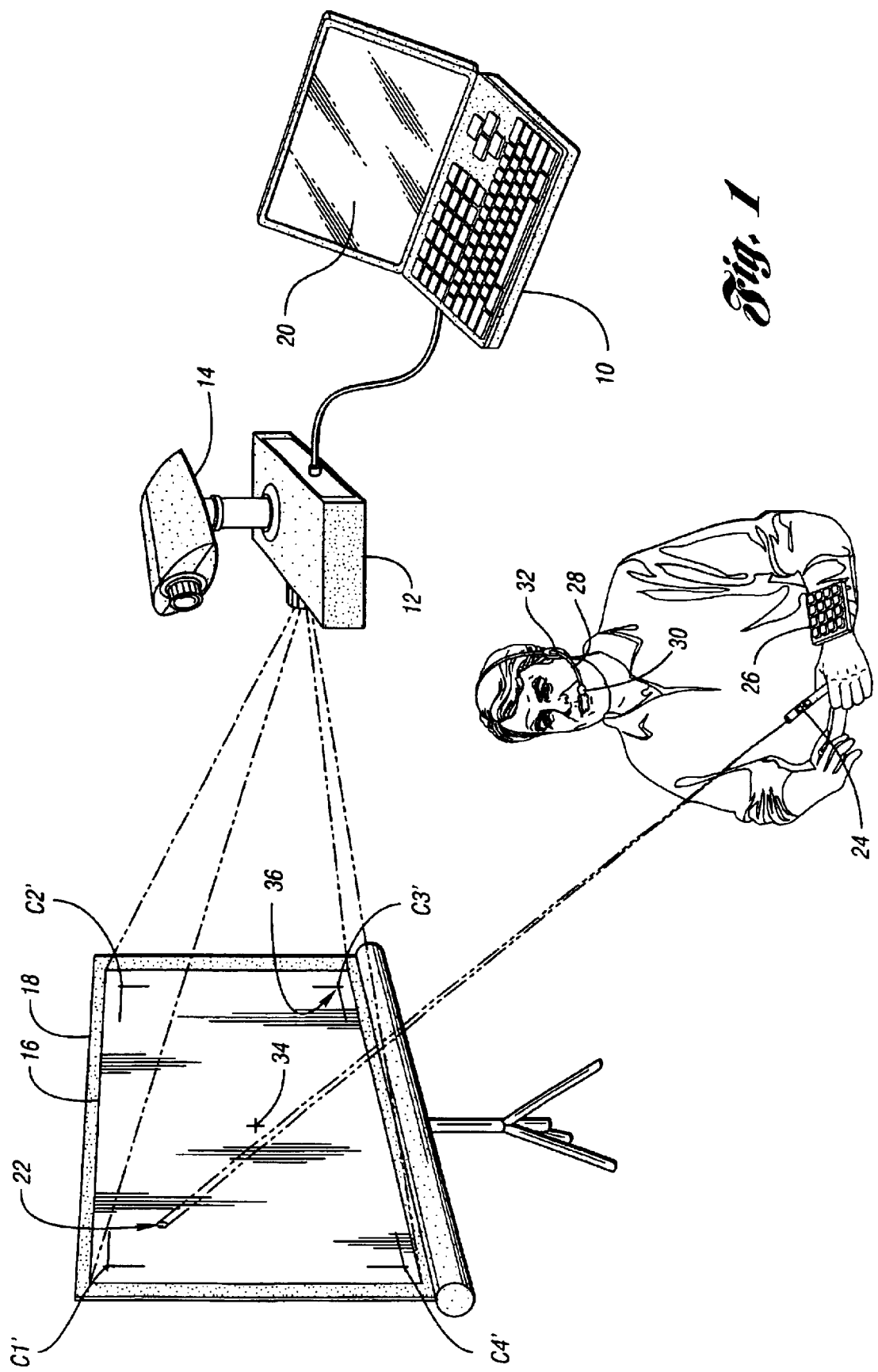
FIG. 1 is a block diagram illustrating a representative computer presentation application for use with a system or method according to the present invention.

Referring now to FIG. 1, a block diagram illustrating a representative computer presentation application with information communicated by an optical pointer according to one embodiment of the present invention is shown. As used herein, the remote control of the computer is intended to include control of various application programs and/or the operating system of the computer, which preferably are controlled via a graphical user interface. However, as explained in greater detail below, the present invention is also capable of transmitting keyboard characters and voice information (directly or through a customizable user interface) that may be used to remotely control either a text-based application or operating system, or to provide information and commands to a graphical user interface of an application program or operating system. In this embodiment, computer 10 is connected to a video projector 12 and a video camera 14. In this embodiment, video projector 12 projects an image 16 of the computer output onto a projection surface or screen, indicated generally by reference numeral 18. Preferably, screen 18 is a "passive" screen, i.e. a substantially planar surface remotely located from computer 10 and of a light color to provide sufficient contrast to the image of computer output generated by projector 12. Various objects may be used to provide such a surface, including projection screens, walls, or the like. Output from computer 10 may also be displayed on an "active" screen which would include a traditional computer screen 20 of laptop computer 10, or any other display device such as a monitor, television, plasma display, or similar "active" device. Such "active" screens may be used alone, or in combination with one or more "passive" screens without departing from the spirit or scope of the present invention.

As also illustrated in FIG. 1, an optical cursor or graphic, indicated generally by reference numeral 22, is generated by a device other than computer 10 and superimposed on image 16 which is output from computer 10. Cursor or graphic 22 could be generated by any of a number of devices including another computer, projector, or the like. In the embodiment illustrated in FIG. 1, cursor 22 is generated by a hand-held optical pointer 24 which preferably has the capability of modulating at least one feature or property of cursor 22.

Preferably, the feature or property is modulated in a predetermined manner or fashion known by computer 10 such that pointer 24 can be uniquely identified. As illustrated and described in greater detail with reference to FIGS. 3 and 4, optical pointer 24 may vary the color, shape (or number of shapes), size, intensity, illumination pattern, motion, and/or position of cursor 22 to generate one or more commands to remotely control computer 10 (directly or via another user interface) according to the present invention. Optical pointer 24 may also communicate with additional input devices such as a keyboard or keypad 26 and headset 28 which preferably includes at least a microphone 30 and may include a speaker or earphone 32. Optical pointer 24 may communicate with keypad 26 and headset 28 via wired or wireless connection(s) depending upon the particular application. Keypad or keyboard 26 is preferably a one-handed keyboard, such as those available from Infogrip, Inc. and can be worn by the user and operated with the opposite hand. Of course, optical pointer 24 may also be integrated into various other input devices, such as keypad 26, for example, and worn by the user, if desired.

Preferably, camera 14, or other detector, repeatedly captures an image including at least a substantial portion of image 16 generated by projector 12. In an alternative embodiment where an active screen is utilized, camera 14 preferably captures at least a substantial portion of the active screen, i.e. computer monitor, display, or television. Computer 10 processes the captured image frames to determine at least one property of external cursor 22. In one embodiment of the present invention, computer 10 processes image 16 to determine at least the position of cursor 22 and generates an appropriate command or commands to move a computer generated cursor 34 to approximately the same position as cursor 24. The tracking of the optical cursor by the computer cursor may have a user or system specified offset depending upon the particular application. Likewise, to provide sufficient stability to the tracking to accommodate user or system induced jitter or other "noise" the tracking preferably includes a filtering function and necessarily lags position of the optical cursor to some degree that depends on various system parameters. As explained in greater detail below, computer 10 may also process captured frames of image 16 to detect a predetermined or known modulation of various other features or properties of external cursor 22 to uniquely identify optical pointer 24 or identify optical pointer 24 as one of a plurality of authorized pointers that may be used to control computer 10. In one embodiment, a pseudo-random modulation strategy is used such that only those pointers following the same pseudo-random pattern synchronized with the computer will be recognized. Position or context-dependent commands may emulate a "left-click" or "right-click" command generated by a traditional computer pointing device, such as a mouse, track ball, touch pad, or the like. In addition to allowing simultaneous use of multiple pointers, or use of only an authorized pointer, modulation of one or more features of optical pointer 24 may be used to transmit a variety of information to computer 10. For example, keypad information from keyboard 26 or voice information from microphone 30 may be transmitted via modulation of various features of optical pointer 24 as explained in greater detail with reference to FIGS. 3 and 4.

In one embodiment of the present invention, computer 10 may periodically generate reticles or fiducials, indicated generally by reference numeral 36, to calibrate or register the image captured by camera 14 relative to image 16 on screen 18. Preferably, each of the four corners of the image of the computer output contains a reticle or fiducial and the fiducials are used to delineate the "active" tracking region where cursor 22 is detected. The fiducials may be any appropriate shape such as a right-angle or cross as illustrated. For applications where screen 18 is not substantially planar, fiducials 36 should cover more of the screen. For example, fiducial lines may extend horizontally or vertically across screen 18.

Preferably, projector 12 (when used), camera 14, and screen 18 are stationary and remain substantially fixed to facilitate the calibration (registration) and tracking process. However, the present invention could also be used in applications where one or more of these devices changes position, although detection of the properties of external cursor 22 becomes more complex and computationally intensive. The calibration or registration process may be repeated automatically at predetermined intervals, based on a user request, and/or when cursor 22 is not detected. In one embodiment of the present invention, reticles or fiducials 36 are progressively moved toward the position of cursor 22 to simplify processing of the image frames to detect cursor 22. In this embodiment, only the area delineated by fiducials 36 is searched or scanned to detect cursor 22. If cursor 22 is not located within the area defined by fiducials 36, their position is either reset to, or progressively expanded toward, the original corners of the processed image until cursor 22 is detected.

Figure 2:
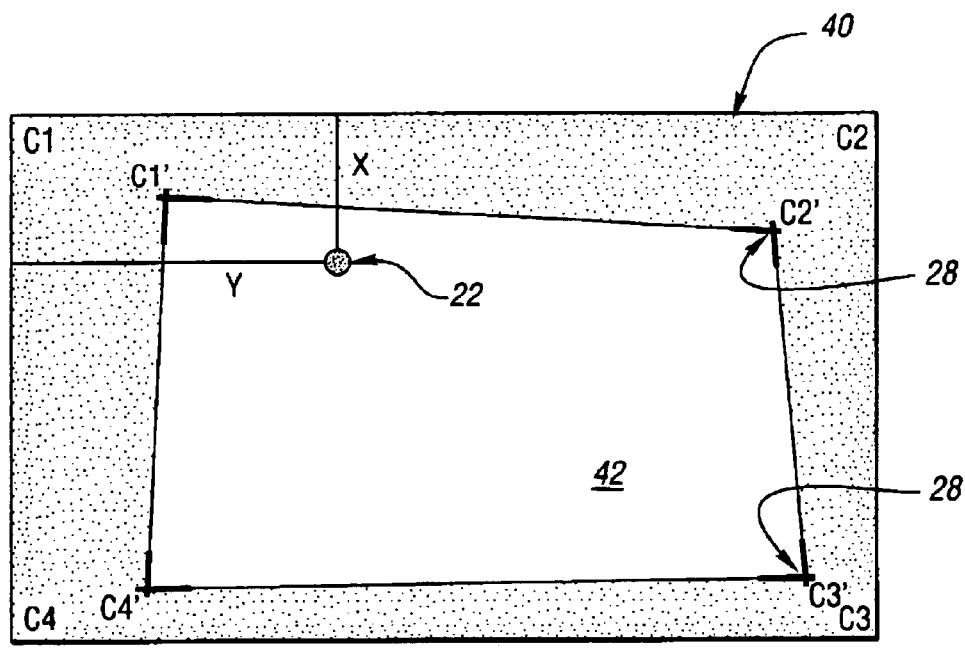
FIG. 2 is a diagram illustrating projection of calibration reticles or fiducials and derivation of coordinates for a cursor projected by a pointer according to one embodiment according to the present invention.

FIG. 2 represents a single image frame 40 captured by video camera 14. Preferably, frames are repeatedly captured and processed to detect modulation of at least one property or feature of cursor 22. Typical frame capture rates are thirty or sixty frames per second. Preferably, the frame capture rate of the video camera and/or the output of an active screen or projector are selected to minimize aliasing and other interference within the frequency bands of interest. Such interference may be produced by the beat frequency or difference frequency between the refresh rate of the screen or projector and the video camera. Any such interference effects may also be reduced by appropriate filtering of the captured image. Filtering may be performed as part of the image processing by the computer, or may be performed by appropriate hardware as part of the image capture process.

Captured image frame 40 preferably includes a substantial portion of the computer output image, represented generally by reference numeral 42. As illustrated in FIG. 2, computer output image 42 may occupy a convex quadrilateral area within captured frame 40. Image 42 will not be rectangular if either or both of the projector and the camera are not located on the line which passes perpendicularly through the center of the screen. Preferably, the computer embeds or superimposes the reticles or fiducials 36 within image 42. Processing of captured image 40 may utilize line and intersection pattern recognition depending upon the particular type of fiducials utilized to locate corners C1', C2', C3', and C4'. Determination of the locations of C1', C2', C3', and C4' and the properties of the external cursor is simplified because their identifying characteristics are known a priori. Identification of items within a static image and identification of dynamic motion of features may be accomplished using any number of known image processing techniques, such as those described in "MACHINE VISION" by Jain, Kasturi, and Schunk, published by McGraw-Hill, ISBN 0-07-032018-7. The present invention is independent of the particular image processing techniques utilized to identify or detect the properties of the external cursor used to remotely control the computer. An exemplary method for determining position or location information of the external cursor is provided below.

The locations of corners C1', C2', C3', C4', and cursor 22 may be determined for a classic video quadrant system having horizontal coordinates represented by X and vertical coordinates represented by Y, with Y=0 representing the topmost scan-line. The number of scan-lines determines the maximum Y value. The positions corresponding to the coordinates for X=0 are the first (left-most) pixel in each scan-line, and the number of pixels per scan-line determines the maximum X value. The line segment C1-C2 corresponds to the X-axis, and segment C1-C4 corresponds with the Y-axis. Points interior to image 42 are represented with normalized (T, U) coordinates where C1' has coordinates (T=0.0, U=0.0), and C3' has coordinates (T=1.0, U=1.0). The normalized coordinates can then be scaled to an appropriate resolution for image 40. Coordinates T and U can be determined for any point in a given video frame using a pair of parametric equations. First, X-Y coordinate pairs for each of the corners C1' through C4' are represented as:

C1'=(X1', Y1')

C2'=(X2', Y2')

C3'=(X3', Y3')

C4'=(X4', Y4')

The parametric equation for a line is P(Q)=P0−Q(P0-P1), where Q is replaced by T and then U in this example. The T-axis is defined using C1'-C2' and C4'-C3' while the U-axis is defined using C1'-C4' and C2'-C3'. Because the embedded quadrilateral defining image 42 is not guaranteed to have parallel boundaries, the mapping from (X,Y) to (T,U) is not a simple rectangular mapping in the general case. However, the mapping may be derived as described below.

The parametric equations for the embedded quadrilateral boundaries defining image 42 are given by:

Upper boundary (LT1): $p(T)=C1'-T(C1'-C2')$

Lower boundary (LT2): $p(T)=C4'-T(C4'-C3')$

Left boundary (LU1): $p(U)=C1'-U(C1'-C4')$

Right boundary (LU2): $p(U)=C2'-U(C2'-C3')$

The mapping in (T,U) may then be defined by selecting either the LT pair or the LU pair and defining a parametric equation in the other variable (either U or T, respectively) as follows:

$$p(T)=LU1-T(LU1-LU2) \qquad 1:$$

or, equivalently:

$$p(U)=LT1-U(LT1-LT2) \qquad 2:$$

Equation 1 represents how the U-axis scales and/or rotates as it traverses the (T,U) space from its location at T=0, to its location at T=1. Equation 2 represents how the T axis scales and/or rotates as it traverses the (T,U) space from U=0, to U=1. As indicated above, either equation may be used to determine a parameteric equation in the other variable. In this example, Equation 1 is selected and the equations for LU1 and LU2 are substituted into Equation 1 to generate Equation 3 as follows:

$$p(T,U)=[C1'-U(C1'-C4')]-T\{[C1'-U(C1'-C4')]-[C2'-U(C2'-C3')]\} \qquad 3:$$

To simplify the notation, it is useful to define a shorthand notation representing the differences or deltas between coordinates of the corner points as follows:

d1: C1'-C2' d2: C2'-C3' d3: C4'-C3' d4: C1'-C4'

Where a difference value applies to the difference between values of only one coordinate, i.e. only the X or only the Y coordinate values, the difference is represented by either an X or Y, respectively, between the "d" and the number. For example, dX2 represents the quantity (X2'-X3'), while dY4 represents the quantity (Y1'-Y4'). The (X',Y') point pairs are then substituted for C1', C2', C3', and C4' in Equation 3, with the delta notation used to simplify the resulting equations.

Depending upon how the four points multiplied by U are paired, one of the following equations results:

$$p(T,U)=[C1'-U*d4]-T[d1-U(d1-d3)] \qquad 4:$$

or $$p(T,U)=[C1'-U*d4]-T[d1-U(d4-d2)] \qquad 5:$$

Equations 4 and 5 are equally valid and each represents a pair of linearly independent equations, one in X and the other in Y because p(T,U) is represented by a generic coordinate pair (X, Y). Equation 5 is selected for this example and split into the X and Y equations:

$$X=X1'-U*dX4-T*dX1+UT(dX4-dX2) \qquad 6:$$

$$Y=Y1'-U*dY4-T*dY1+UT(dY4-dY2) \qquad 7:$$

Equations 6 and 7 are then solved for T and U, respectively, to produce equations 8 and 9 as follows:

$$8: T = \frac{X1' - X - U*d4}{dX1 - U(dX4 - dX2)}$$

$$9: U = \frac{Y1' - Y - T*dY1}{dY4 - T(dY4 - dY2)}$$

Because Equations 8 and 9 are linearly independent, either equation can be substituted into the other. In this example, Equation 9 is substituted into Equation 8 to obtain:

$$10: T = \frac{X1' - X - dX4\dfrac{Y1' - Y - T*dY1}{dY4 - T(dY4 - dY2)}}{dX1 - (dX4 - dX2)\dfrac{Y1' - Y - T*dY1}{dY4 - T(dY4 - dY2)}}$$

Which is now only an equation in T for an arbitrary point having coordinates (X,Y) in the original space. Solving Equation 10 for T yields a simple quadratic in T:

11: $0 = AT^2 + BT + C$ where $A = dY1(dX4 - dX2) - dX1(dY4 - dY2)$ $B = dX1*dY4 - (Y1 - Y)(dX4 - dX2) - dY1*dX4 + (X1 - X)(dY4 - dY2)$ $C = dX4*(Y1 - Y) - dY4(X1 - X)$ Equation 11 may then be solved using the quadratic formula. In Equation 11, A is constant, while B and C vary depending upon the values of X and Y. As such, if the lines formed by extending the segments C1'-C2' and C4'-C3' intersect, there will be two solutions to Equation 11, one of which is the T coordinate of the point of intersection, the other of which is the correct value for T. If the lines do not intersect, the single solution will be the correct value for T. Once the correct value of T is determined, it is back-substituted into Eqn. 9 to determine the corresponding value for U.

The above example demonstrates that once C1', C2', C3', and C4' are known, and the (X,Y) coordinates of cursor 22 are determined, a straight-forward computation yields values for (T,U) which represent the "mouse coordinates" for computer generated cursor 26 of the computer output. Because the T-U coordinate system has been normalized, any coordinates with T or U outside of the normalized range (0 to 1) can be ignored for tracking purposes because they do not fall within image 42 of computer output. To determine the scaled values for the coordinates of computer generated cursor 26, T is multiplied by the horizontal resolution and U is multiplied by the vertical resolution of the captured image 40. Once the calibration or registration process has determined C1', C2', C3', and C4', modulation and or movement of at least one property or feature of cursor 22 is monitored or tracked by repeatedly capturing and analyzing frames as illustrated and described with reference to FIG. 5. In one embodiment of the present invention, position of cursor 22 is determined only while cursor 22 is within projected image 42 while various other modulated properties of cursor 22, such as shape, color, size, etc. are monitored as long as cursor 22 is within captured image 40, i.e. even when cursor 22 is outside of projected image 42.

While rectangular/perspective distortions, such as pincushion, can be taken into consideration and normalized as described above, correction/mapping of various other types of distortion may also be performed in accordance with the present invention. Depending upon the particular application, multiple mappings may be used for various regions of the image, rather than using a single mapping for the entire captured image. Likewise, the particular source of the distortion does not necessarily impact the correction for that distortion. For example, the above approach may be modified to account for distortion introduced by lens systems of the camera (or other optical detector) and projector apart from the distortion that can be introduced by projection onto a non-planar surface or projection at an angle. All of these distortions can be compensated or corrected using appropriate calibration screens, similar to but perhaps more complex than the reticles described and illustrated in the present application. As the levels of distortion increase, more and more complex calibration screens may be needed. Depending upon the particular type of distortion, the mathematics may be significantly more complex than the example above. However, as processor speed and capability continue to improve, the computational complexity has less of an impact on system performance.

Figure 3:
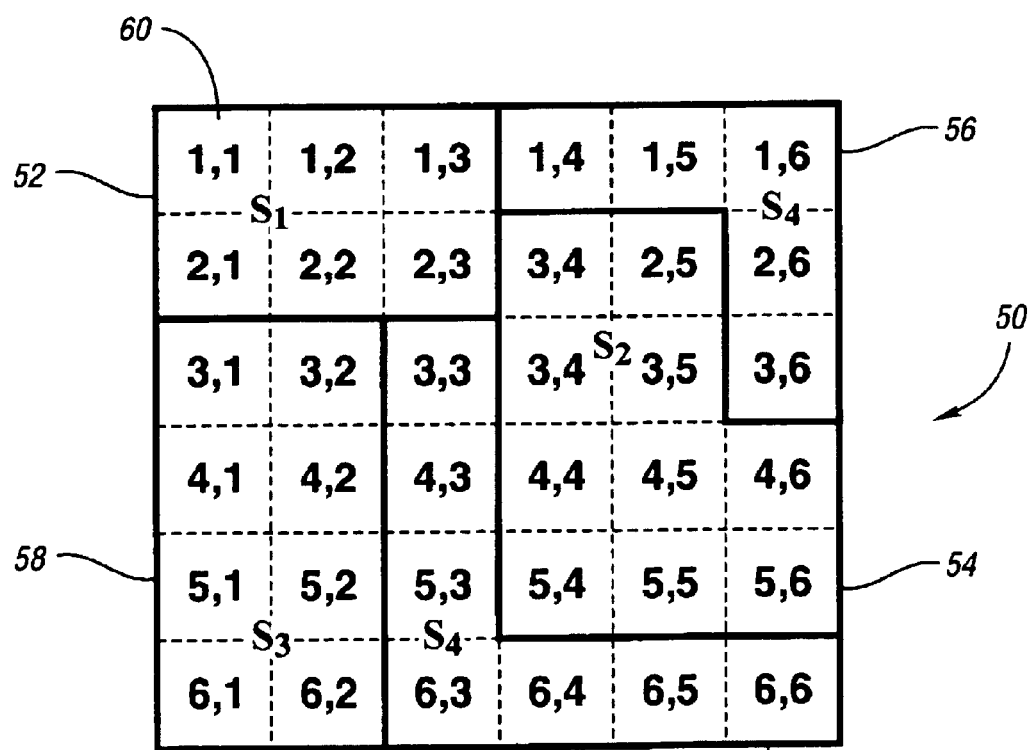
FIG. 3 is a diagram illustrating sections, areas, and attributes of an optical pointer or device according to one embodiment of the present invention.

Referring now to FIG. 3, an output array of a representative optical pointer according to one embodiment of the present invention is shown. Optical pointer 50 includes a plurality of sections ($S_1$–$S_4$) indicated generally by reference numerals 52, 54, 56, and 58. Each section includes a predefined group of one or more areas delineated in the Figure by dashed lines and represented generally by area 60. As illustrated in FIG. 3 for section $S_4$ represented by numeral 56, the areas forming a section need not be contiguous or symmetric. In this example, areas (1,4), (1,5), (1,6), (2,6), (3,6), (3,3) (4,3), (5,3), (6,3), (6,4), (6,5), and (6,6) form a single section $S_4$. As illustrated and described in greater detail with reference to FIG. 7, each area 60 may be generated by a portion of an emitter, a dedicated emitter, or a cluster of emitters acting together. Preferably, each area includes a set of attributes, the modulation of which can be used to distinguish a given area among successive image frames. For most implementations, all areas will have identical attribute sets. This is not required although simplifies the design and implementation.

Figure 4:
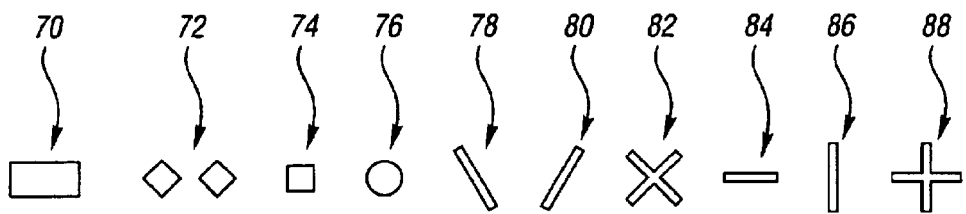
FIG. 4 illustrates representative shapes for areas of an optical pointer or device according to one embodiment of the present invention.

FIG. 4 illustrates various values for a representative shape attribute of an optical pointer area according to one embodiment of the present invention. As illustrated, shapes 70–88 take various forms that may include a rectangle 70, square 74, circle 76, or line, such as lines 78, 80, 84, and 86. As illustrated by the lines, a particular geometric shape may have various orientations. Likewise, a particular shape may be composed of smaller sub-shapes as represented by double diamonds 72. Similarly, cross 88 and "X" 82 may be composed from discrete intersecting lines or segments.

Figure 5:
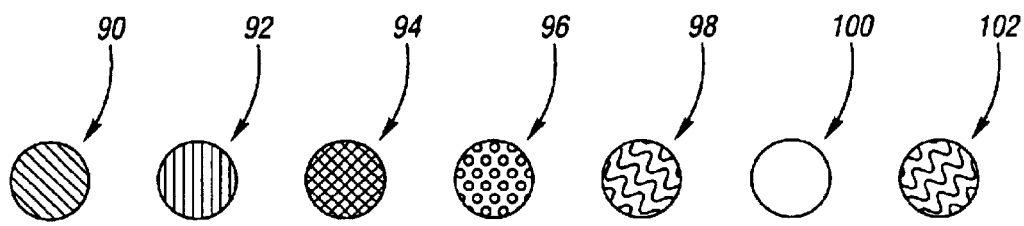
FIG. 5 illustrates representative frequencies or wavelengths for areas of an optical pointer or device according to one embodiment of the present invention.

FIG. 5 illustrates various values for another representative attribute of an optical pointer area according to one embodiment of the present invention. As illustrated schematically in FIG. 5, a "color" attribute may have various values. As described above, the color attribute actually represents a wavelength or range of wavelengths (or frequencies) for each value which may correspond to visible colors generally illustrated as red 90, yellow 92, orange 94, blue 96, and green 98. In addition, infra-red 100 and ultra-violet 102 wavelengths may be used, among others, depending upon the particular implementation. Of course, the camera or other receiver or detector should be capable of detecting and distinguishing between the various color attribute values for proper operation of the system.

Figure 6:
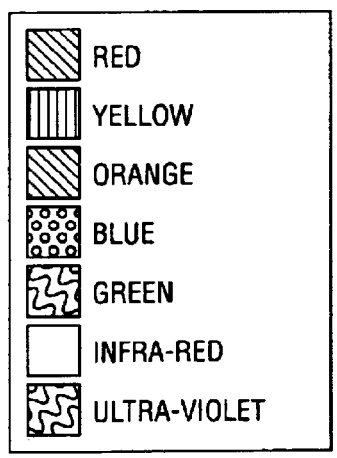
FIG. 6 illustrates representative intensities for areas or sections of an optical pointer or device according to one embodiment of the present invention.

FIG. 6 illustrates another representative attribute for optical pointer areas according to one embodiment of the present invention. As schematically depicted in FIG. 6, an intensity attribute may have various values, generally represented by low 100, medium 112, and high 114 intensities, respectively. Again, the number of intensities and degree of variation will depend upon the particular application. However, the camera or other detector in combination with the processing software should be able to accurately and reliably discriminate between the values for each of the area attributes for error-free operation. Of course, to optimize performance of the system, any of a number of error detection and correction algorithms may be employed in combination with appropriate encoding strategies.

Figure 7:
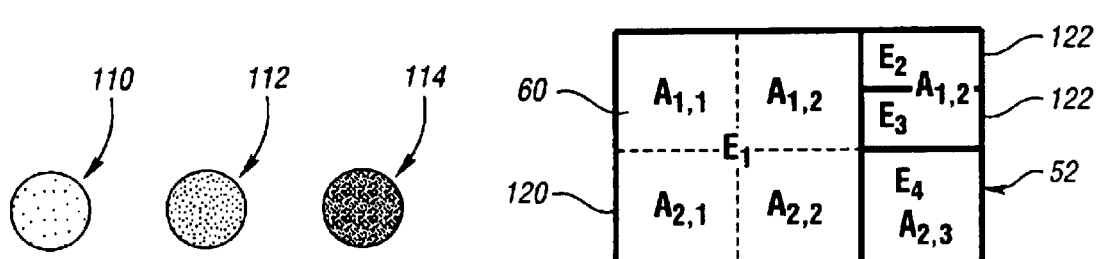
FIG. 7 is a diagram illustrating the relationship between emitters and areas for a representative section of an optical pointer or device according to one embodiment of the present invention.

Referring now to FIG. 7, a diagram illustrating the relationship between emitters and areas of a representative optical pointer according to one embodiment of the present invention is shown. FIG. 7 represents a section 52 (FIG. 3) which includes a total of six areas 60. As also illustrated, emitters 120, 122, 124, and 126 are capable of generating one or more areas 60, or a portion of an are when clustered with other emitters. Stated differently, an area is generated by a portion of an emitter, a dedicated emitter, or a cluster of emitters acting together. For example, emitter $E_1$ represented by reference numeral 120 generates a total of four areas 60: $A_{(1,1)}$; $A_{(1,2)}$; $A_{(2,1)}$; and $A_{(2,2)}$. In contrast, area $A_{(1,3)}$ is generated by emitters to 122, 124 acting together and area $A_{(2,3)}$ is generated by a dedicated emitter 126.

As illustrated and described with reference to FIGS. 3–7, each area may have one or more attributes with each attribute having one or more defined values. For an attribute of shape, these values may include square, triangle, circle, or line. For an attribute of color, these values may include red, blue, green, white, or 1R. For an attribute of intensity, values may include low, medium, and high. Note that "off" is not an intensity attribute, but rather an absence of any attribute for the given area.

The number of values for a given attribute is defined as VA(Attribute). In the above definition for attribute values, VA(shape) is 4, VA(color) is 5, and VA(intensity) is 3.

The set size for a given area's attribute set is defined as VS(Area), and is the product of the different VA( ) values available for the given area, plus one for the "off" state. In the above definition for attribute values, and assuming that all areas in an optical pointer are designed identically, VS(Area) is 4*5*3+1, or 61, i.e. the product of VA(x) where x is each of the attributes, plus one for the "empty set" when the area is "off". Of course, if all areas within a pointer are "off", the pointer cannot be located. If, however, the position is being tracked, or at least one area is not "off", the locations may be inferred.

A pointer has a "dominant shape" which is determined by the perimeter, circumference, or "hull" around all of its emitters/areas when all are active at some predetermined intensity. A pointer can have embedded shapes or "subshapes" which are formed by various combinations of emitters/areas turned off while others are active. All of the sub-shapes will fit within the outline formed by the dominant shape, but may be entirely different. For example, the dominant shape of a pointer may be square, but the various areas within the square may be capable of generating stars, circles, triangles, etc., in the same manner that a dot matrix is rectangular but is capable of generating a multitude of shapes, all smaller than the dot matrix displaying them.

Each section of the optical pointer has a set of "states", formed by the areas and area attributes within that section. The size of this set is the product of the number of areas forming the section, and VS(Area) if each area is identical in design. If the Areas are differing in design, the size of this set is the sum of VS(Area) for all areas within the section. This size is defined as MaxSn, where "n" represents the section number if the pointer has more than one section. As an example, if a given section had 10 identical Areas with VS(Area)=61 as in the example above, MaxS for that Section would be 61*10, or 610.

A Section is "modulated" when one or more of its areas changes its attribute set. To uniquely identify a pointer, one or more sections may be modulated with a predetermined or pseudo-random pattern which is known by the detector/processor, i.e. the attribute set changes in a predetermined manner to transmit a pointer "signature" which can be identified by the detector. The modulation rate for a section is given by the number of times per second that a the attribute set of a section changes. This is defined as ModSn. The bandwidth of a section is defined as the product of MaxS and ModS. As an example, if ModS is 30 for the example section with MaxS of 610 above, the bandwidth for that section would be 18,300. In the most simple encoding scheme, this is also equivalent to the bit-rate, but there are several encoding schemes which yield multiple bits per system-state-change, which could be used to give higher data throughput. Increasing the number of areas per section will also yield higher rates, e.g. a section consisting of a square 5×5 array of these same areas would have a bandwidth =30*25*61 =45750, which is sufficient for CD-quality audio (40 kbits/second) with a simple encoding strategy or scheme.

The intensity, color, and shape modulations described herein are achievable using a variety of known techniques. As an illustrative example, the digital light processing (DLP) technology available from Texas Instruments, Inc. One or more DLP arrays could be used to modulate the color/intensity/shape of an individual emitter, or could be used to create multiple "emitters" from a single emitter, each controllable by sections of a given DLP array. For purposes of the present invention, a hand-held DLP projector driven by a dedicated single-board computer could provided the necessary functionality of the optical pointer with an associated keyboard or keypad and/or microphone/speaker. The on-board computer senses the buttons pressed by the user or samples the sound to generate a digital data stream, then generates the image which is subsequently projected by the hand-held DLP projector. Such a pointer could use a rectangular dominant shape with a single white-light emitter, with a rectangular array of areas (the pixels in the DLP element), each of which has a fixed square shape, but which can change color and intensity. The number of areas is the total number of pixels in the DLP element and the number of sections is one.

In one possible implementation of a "complete control" system, the user has a keyboard (preferably a one-handed one) and wears a microphone. The embedded computer driving the optical pointer output encodes the keystrokes and speech into the light projected by the optical pointer. The video frames are captured by the camera and processed to extract the encoded information and decode the keystrokes/audio, and pass them on to a graphical user interface application program or operating system. This permits data entry, as well as voice command via the pointer, without limitations of RF transmission distance, quite literally enabling a full computer demonstration on a screen at one end of a football field, for example, by a presenter up in the stands at the other end of the field. The presenter is not tied to the computer by wires or RF transmission limitations. If the presenter can see his pointer on the screen, so can the capturing camera or other detector, since it is preferably located in close proximity to the projector generating the output image.

Figure 10:
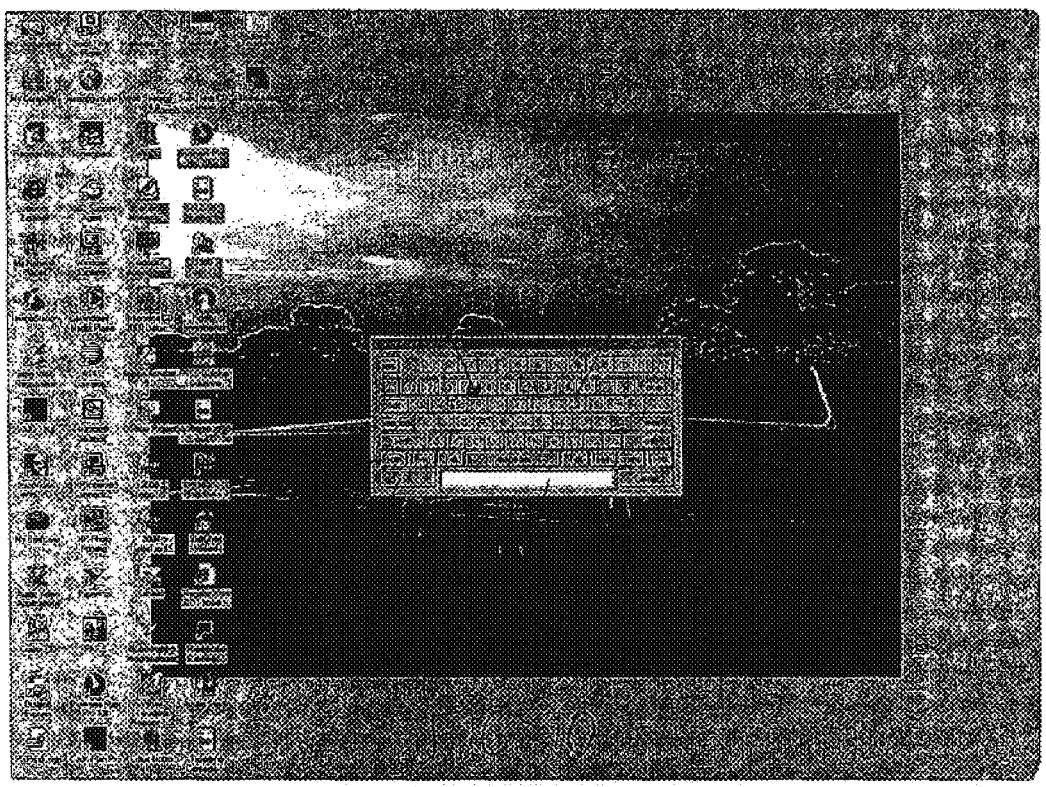
FIG. 10 is a diagram illustrating a customizable user interface used to enter keyboard information or other information into another application running on a computer associated with a computer presentation system according to the present invention.
Figure 11:
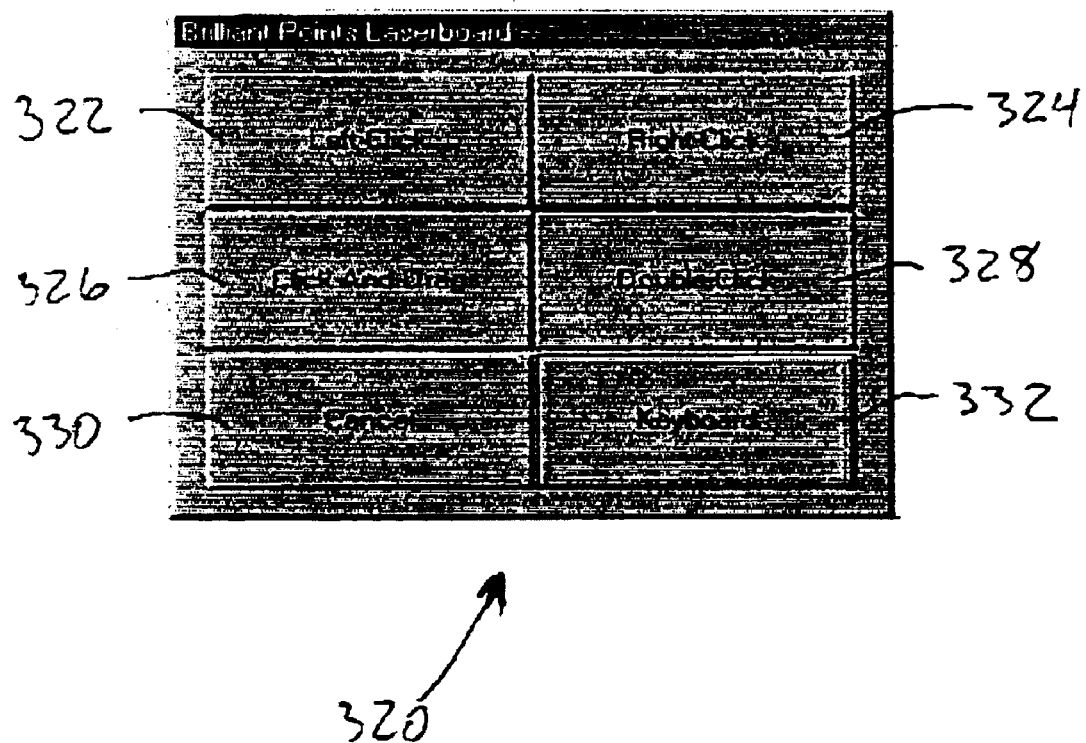
FIG. 11 is a diagram illustrating a customizable user interface used to enter other commands into an application running on a computer according to the present invention.

Another possible implementation of a "complete control" system activates a customizable user interface to generate and store a series of keystrokes and/or commands that are subsequently provided to another program or operating system. The customizable user interface may be activated using a conventional optical pointing device based on a button press, motion, dwell, pattern of movement, or the like. Once the user interface is activated, the optical pointer can be used to generate commands or keystrokes. A "send" command, corresponding to a button on the interface or associated with modulation of another pointer property, for example, transfers the series of keystrokes or commands to one or more background applications or the operating system. In one embodiment, as illustrated in FIG. 10, the customizable user interface 300 resembles a traditional keyboard. User interface 300 is activated when a predetermined command is transmitted using a laser pointing device. In this example, the optical pointer cursor dwells on a particular location 302 (with some specified tolerance) for a predetermined time to activate user interface 300. Any or all of the predetermined parameters, such as the type of command to activate the user interface, the time associated with a dwell, etc. may be user-specified or selected depending upon the particular application. Once activated, user interface 300 may include various regions 304 corresponding to alphanumeric keys 306 and/or command keys 308. Buttons or keys on user interface 300 may be operated in a similar fashion as the commands used to activate user interface 300. For example, a key press may be indicated by dwelling on a corresponding region 304 of user interface 300 for a predetermined time. Alternatively, a key press may be indicated using a button on the optical pointer to change one or more properties of the optical cursor, such as the shape, color, intensity, modulation, etc. In one embodiment, a key press is indicated by turning the optical pointer "off" then "on". The characters may be stored and displayed in a buffer 312 for modification by the user. After the desired series of one or more commands or keystrokes are entered, another button or command 310 is used to transfer the input to one or more application programs or the operating system. Although illustrated using an exemplary keyboard, one of ordinary skill in the art will appreciate that the customizable user interface according to the present invention may be used to provide any number of user or developer specified keypads, menus, or the like to generate input for application programs or the operating system. For example, in the embodiment illustrated in FIG. 11, a command menu 320 is displayed when activated by the optical pointer. Command menu 320 includes buttons corresponding to mouse commands, such as a left-click 322, right-click 324, click-and-drag 326, and double-click 328. Additional control features or commands may also be activated using other buttons, such as cancel 330 and a command or button to pop-up a keyboard 332 as illustrated and described with reference to FIG. 10.

In a sufficiently complex pointer, different sections could be devoted to encoding different "channels" of information. For example, one section could carry mouse events, another voice information, a third keyboard strokes, a fourth GPS coordinates of the pointer, etc., limited only by design and video capture/processing rate limits. The kinds of data which can be transferred through this pointer are limited only by the imagination.

The motions introduced into the pointer are typically the result of hand motions of the presenter, but could also be generated by attaching the pointer to other body areas, or mounting the emitter array on a variety of platforms capable of moving in one or more directions, such as a small actuator driven X-Y slide, or a rotating table, or some other device capable of giving the desired motion. In this manner, a pattern of motion may be used as a possible mechanism for generating commands/data for the computer system. This is easily accomplished by tracking pointer location across time and analyzing the resulting "motion history" for patterns with defined significance. A further extension to this is to track patterns across time and define a grammar to translate the resulting information into data and/or commands. This is readily accomplished by defining tokens for each pattern, then using tools such as LEX and YACC (from UNIX) to translate the pattern stream into actions, code sequences, and/or data. This may also be extended into patterns of patterns, etc., nested as deeply as desired.

Unintended motions of the optical pointer may be introduced when the user clicks a button on the optical pointer to change one or more properties. The greater the distance between the optical pointer and the object acting as the projection screen, the greater the effect of a small movement because clicking a button generally results in an angular deflection rather than a linear displacement. By physically or mechanically isolating any button presses from the device that generates or controls the position of the optical cursor, the cursor position is easier to control and has improved stability. In one embodiment, a separate command module includes at least one button and communicates button presses to the optical device, which then generates an appropriate command as described elsewhere herein. The command module may communicate with the optical cursor device using wired or wireless communication. For example a low power RF signal may be used because of the small distance between the devices. This type of communication link would be more reliable than using a similar RF link to couple to a remotely located computer that may be several hundred feet away.

An alternative method for providing mechanical isolation of movement associated with key presses on an optical pointer is to provide a smal gyroscopic stabilizer or angular momentum wheel within the optical pointing device. A stabilizer resists unintended angular deflections while allowing a user to apply intentional translational force to depress a button or to change position of the optical cursor, for example. In effect, the stabilizer would provide a damping force to reduce or minimize unintended movements of the optical cursor.

Either of the above mechanisms used alone will significantly improve the ability of a given user to place the optical cursor on a desired location with accuracy and generate a command associated with a button press. Used together, these mechanisms should provide substantial improvement because they each affect different aspects of the inaccuracy or instability. Physical isolation of one or more buttons addresses the case of a user intentionally applying a force to depress a button and unintentionally producing angular deflection that changes optical cursor position. The mechanical isolation in the form of a stabilizer or damping mechanism, such as a momentum wheel or gyroscope, addresses the case where the user has minor hand tremors or other inadvertent hand motions. Both mechanisms, whether used alone or in combination, permit intentional angular deflection or translational movement. The use of a momentum wheel or gyroscope may require an additional power pack (e.g. a belt-worn battery pack) although advances in battery technology may allow a self-contained pointer and momentum wheel with internal battery power.

If pointer orientation is tracked (through designated orientation indicator areas and/or properly designed dominant shape), additional "movement" attributes may be communicated, such as rotation, size, focus, etc., as data generation mechanisms. For example, consider a pointer having a dominant shape corresponding to a simple "angle", like the ">" symbol on a keyboard. This shape has an obvious orientation. If the user of the pointer rotates the pointer by twisting their wrist or by some other mechanism, the orientation of the pointer changes and can be used to generate a command (such as a "mouse rotate clockwise") to control the system. This is but one advantage of the present invention over traditional input mechanisms for windows-oriented computer systems, such as a mouse, touch-pad, or tablet, which are not designed to track orientation of the input device.

Because the effective magnification of the image projected by the optical pointer changes as a function of the distance between the pointer and the screen, when the pointer is closer to the screen/detector, the overall size will be smaller than when it is farther away. The relative change in size depends on a ratio of the distance the pointer moves relative to the maximum distance between the pointer and the screen. Depending upon the overall distance, this characteristic may not be useful in an auditorium-style presentation. However, in a small environment it can be used to generate additional commands or sequences of commands after appropriate calibration. For example, because the size of the dominant shape shrinks as the pointer approaches the screen/detector, this can be translated into a "mouse push" command, enabling 3-D control (X, Y, and Depth), or a more intuitive zoom control. As the pointer is pulled away from the screen/detector, the change in size can be translated into a "mouse pull", the converse of the "mouse push".

Further 3-D style commands could be generated by interpreting the geometric distortion of the dominant shape and/or embedded sub-shapes due to the angle at which the pointer is projected onto the screen/detector. At near perpendicular angles, very little distortion occurs, other than the size increase/decrease due to distance. At oblique angles, substantial distortion occurs. The distortion is readily mapped back to rectangular using a similar approach to that described above., and an approximate angle/direction to the pointer can be determined. This could be used to generate 3-D rotational commands or sequences of commands, for example, in a CAD environment.

Figure 8:
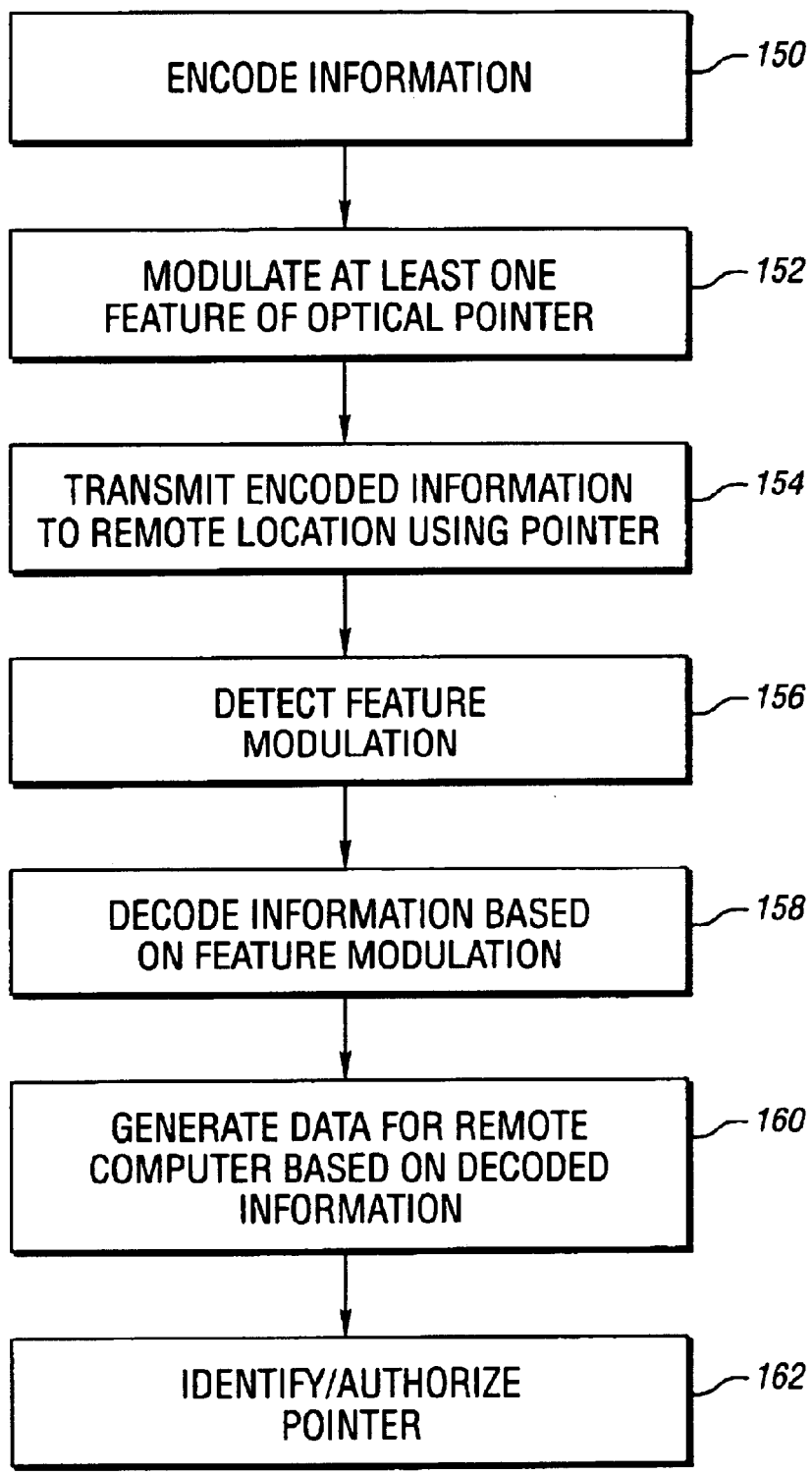
FIG. 8 is a flow chart illustrating operation of a system or method for transmitting information to a remote computer using an optical pointer or device according to one embodiment of the present invention.

Referring now to FIG. 8, a flowchart illustrating operation of one embodiment of a system and method according to the present invention is shown. As will be appreciated by one of ordinary skill in the art, the flowchart illustrated in FIG. 8 may represent any of a number of known processing strategies such as event-driven, interrupt-driven, multi-tasking, multi-threading, and the like. Similarly, the present invention is independent of the particular programming language, operating system, or computer platform which may be used to implement the invention. As such, various steps or functions illustrated may be performed in the sequence illustrated, in parallel or in some cases omitted altogether. Likewise, the order of processing illustrated is not necessarily required to achieve the objects, features, and advantages of the invention, but is provided for ease of illustration and description.

Preferably, the logic of FIG. 8 is implemented primarily in software which is executed by a microprocessor-based computer, such as a laptop or desktop computer, represented generally by computer 10 of FIG. 1. Of course, various portions or functions of the illustrated logic may be implemented in software, hardware, or a combination of software and hardware. Likewise, various steps or functions may be performed by a user or device controlling an optical pointer. The flowchart of FIG. 8 illustrates one "loop" and its operations are preferably repeated at periodic time intervals or as required by some internal or external event, as known by those of skill in the art. Preferably, control logic represented in FIG. 8 is embodied in data stored on a computer readable storage medium, such as a floppy disk, hard disk, CD-ROM, tape, or other magnetic, optical or combination storage media. The computer readable storage medium includes data representing instructions executable by a computer to detect information generated by an optical pointer through modulation of at least one feature or attribute.

Block 150 of FIG. 8 represents encoding information for transmission by an optical device, such, as an optical pointer, according to one embodiment of the present invention. As described above, the information may include keypad or keyboard information or characters, voice information, text messages, identification information or the like. The information may be encoded using any of a number of known encoding strategies. Preferably, a built in processor or computer of the optical pointer encodes the information and produces corresponding signals to modulate at least one feature of the pointer as represented by block 152. As described above, preferably one or more sections of the optical pointer are modulated by changing corresponding attribute sets. The optical pointer transmits or projects the encoded information onto a destination or remote location as represented by block 154. In one embodiment, the destination is a remotely located screen or surface. However, depending upon the particular application and implementation, the remote location may be the camera or detector, i.e. the optical pointer transmits directly to an optical detector, such as a CCD array of a camera or the like, rather than indirectly via a surface imaged by a camera.

The optical device feature modulation is detected as represented by block 156. In one embodiment, a camera is used to capture a series of image frames which include at least a portion of the remote destination or screen. The image frames are then processed, preferably by an associated computer, to detect and decode the encoded information as represented by block 158. Corresponding data and/or commands are then generated for the remote computer based on the decoded information as represented by block 160. This information may also be used to identify or authorize the pointer and/or user as represented by block 162 with corresponding commands generated only if the pointer is authorized, or associated with a particular one of a plurality of pointers being used simultaneously. When used in a personal identification application, the commands generated may be used to control access to a particular building, room, area, or computer, for example.

Figure 9:
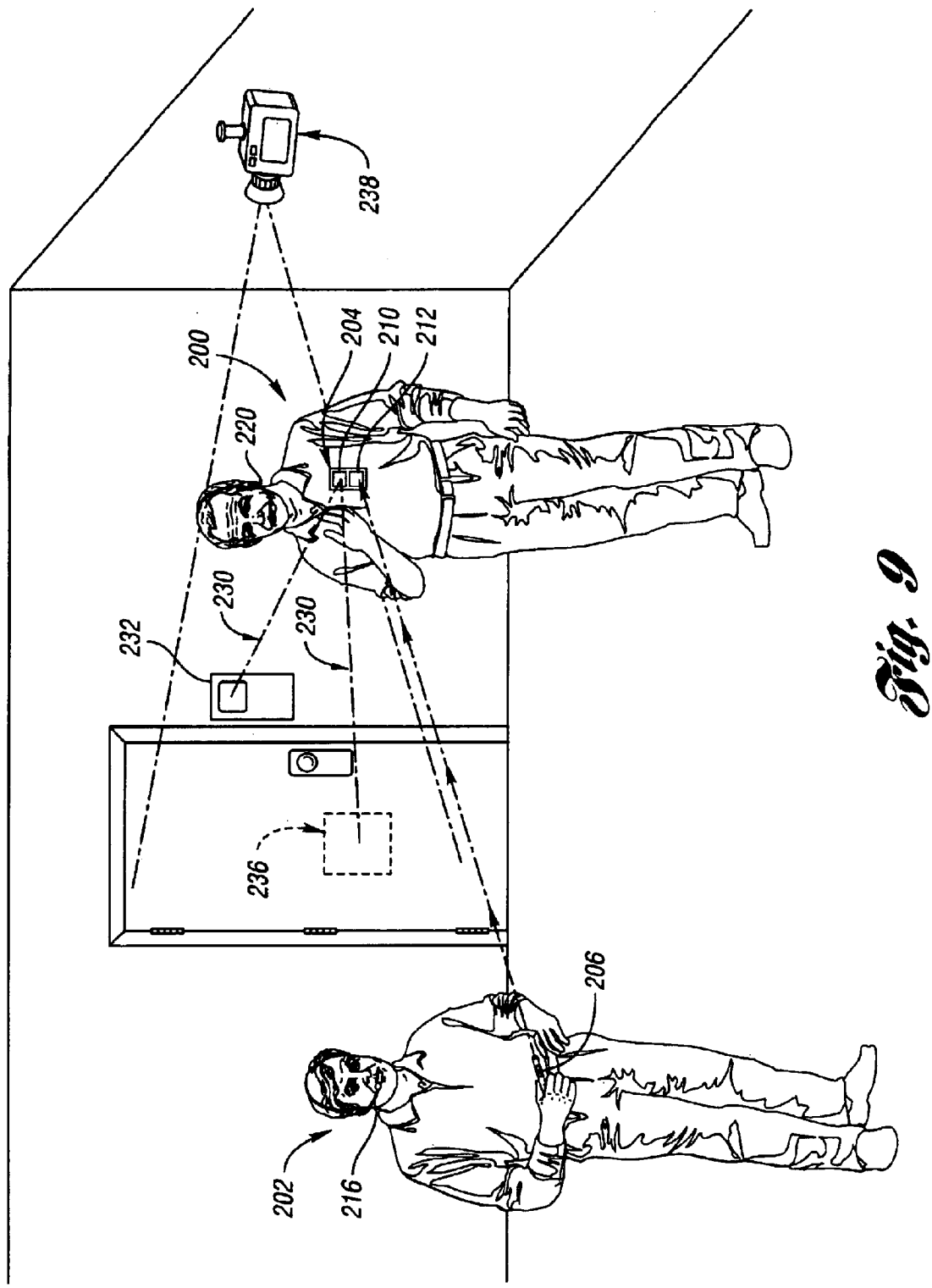
FIG. 9 is a diagram illustrating an optical device used for personal identification and/or communication according to one embodiment of the present invention.

FIG. 9 illustrates a representative personal identification and/or communication application of an optical device according to one embodiment of the present invention. Users 200, 202 may use optical devices 204, 206 for identification and/or optical line of sight communication. For example, optical device 204 may include a transmitter or emitter array portion 210 and an optional receiver or detector portion 212. User 202 may use an optional headset 216, keyboard (not shown) or other input device to provide information to optical device 206 for encoding and transmitting as described above. Modulation of features of handheld optical device 206 is detected directly by receiver/detector 212 of optical device 204. The received signal is then decoded and provided to user 200 via headset 220 or other output device depending upon the particular application. As illustrated in FIG. 9, optical device 204 may be worn by user 200, if desired.

As also illustrated in FIG. 9, optical device 204 may be used to uniquely identify user 200 by periodically (or when commanded by the user) transmitting an optical signal 230 containing identification information. Optical signal 230 may be directly detected by a corresponding receiver/detector 232 which processes the signal to decode the information based on the detected feature modulation and identify user 200. The decoded information may be used to generate commands to gain access to a particular room, building, area, or computer, for example. Alternatively, optical device 204 may transmit encoded identification information via optical signal 230 to a surface 236 for indirect detection by a camera 238, which repeatedly captures, stores, and processes video frames as described above.

As such, the present invention provides a number of advantages relative to prior art strategies and is valuable for controlling and/or demonstrating one or more computer applications in an auditorium-style presentation. As described above, the present invention enables input of any kind of information, such as keyboard, voice, mouse, or other input device. The bandwidth of the information input via a system and method of the present invention is limited only by the selection of the pointer features and attributes, video frame capture rate of the camera or detector, and the classic Nyquist sampling restrictions.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for remotely controlling a computer, the method comprising:

displaying output from the computer on a remotely located screen;

encoding keyboard information by modulating one or more optical pointer features;

projecting the encoded keyboard information on the remotely located screen;

capturing a plurality of image frames including at least a portion of the remotely located screen;

processing image frames to detect and decode the encoded keyboard information transmitted by the optical pointer; and generating a command to control the computer based on the decoded information.

2. The method of claim 1 further comprising:

encoding voice information by modulating one or more optical pointer features.

3. The method of claim 1 wherein the step of processing comprises detecting a change in orientation of the optical pointer.

4. The method of claim 1 wherein the step of processing comprises detecting a pattern of movement, a change in orientation, or a change in size of the optical pointer, and wherein the step of generating a command comprises generating a sequence of commands.

5. The method of claim 1 wherein the step of processing comprises detecting a pattern of movement of the optical pointer.

6. The method of claim 5 wherein detecting a pattern of movement comprises detecting a change in size of an optical pointer feature.

7. The method of claim 6 wherein detecting a pattern of movement comprises detecting an increased size of an optical pointer feature and wherein the step of generating a command comprises generating a zoom command for the computer.

8. The method of claim 5 wherein the step of generating comprises generating a scroll command for the computer.

* * * * *